（12）United States Patent
John

(10) Patent No.: US 8,296,605 B2
(45) Date of Patent: Oct. 23, 2012

(54) SYSTEMS AND METHODS FOR CORRECTING SOFTWARE ERRORS

(75) Inventor: Peter John, Heldelberg (DE)

(73) Assignee: SAP AG, Walldorf (DE)

( * ) Notice: Subject to any disclaimer, the term of this patent is extended or adjusted under 35 U.S.C. 154(b) by 270 days.

(21) Appl. No.: 12/314,406

(22) Filed: Dec. 10, 2008

(65) Prior Publication Data

US 2010/0146325 A1 Jun. 10, 2010

(51) Int. Cl.
*G06F 11/00* (2006.01)
(52) U.S. Cl. ............... 714/38.1; 714/25; 714/48
(58) Field of Classification Search .......... 714/38, 714/2, 38.1, 48, 25
See application file for complete search history.

(56) References Cited

U.S. PATENT DOCUMENTS

| | | | |
|---|---|---|---|
| 7,774,760 B2* | 8/2010 | Mishra et al. | 717/128 |
| 2002/0112200 A1* | 8/2002 | Hines | 714/38 |
| 2002/0116665 A1* | 8/2002 | Pickover et al. | 714/38 |
| 2007/0050678 A1* | 3/2007 | Estes et al. | 714/38 |
| 2007/0240118 A1* | 10/2007 | Keren | 717/124 |

\* cited by examiner

*Primary Examiner* — Scott Baderman
*Assistant Examiner* — Sarai Butler
(74) *Attorney, Agent, or Firm* — Finnegan, Henderson, Farabow, Garrett & Dunner, LLP

(57) ABSTRACT

Systems and methods consistent with the invention may include receiving an indication that a software error was detected during operation of the application program, generating an error message based on the software error, the error message including an error signature, comparing the error signature with information stored in a patch library database to identify a corresponding correction patch, and correcting, when the corresponding correction patch is identified, the software error by applying the corresponding correction patch.

18 Claims, 8 Drawing Sheets

SYSTEMS AND METHODS FOR CORRECTING SOFTWARE ERRORS

BACKGROUND

1. Relevant Field

Systems and methods consistent with the present invention generally relate to maintenance of computer systems and computer programs. More particularly, systems and methods consistent with the invention relate to correcting software errors and/or bugs.

2. Background Information

Businesses and other organizations rely on computer programs, modules, business applications, and software applications (broadly and collectively referred to hereafter as "application programs") to perform various tasks during the course of their operation. This reliance has lead to the development of complex and sophisticated application programs, which require constant maintenance and support to ensure that they operated without disruption. Implementation of maintenance and support mechanisms includes, for example, correcting software errors and/or bugs (broadly and collectively referred to hereafter as "software errors") that are detected during operation of an application program.

Conventional maintenance and support mechanisms may require the user and/or customer of an application program to report the error to a technician employed by the vendor of the application program, where the technician may remotely access the user's device (running the application program) to correct the error. Alternatively, the user may search for a potential solution for correcting the error by searching through technical manuals and implementing a solution suggested therein. These maintenance and support mechanisms, however, require manual intervention and are resource intensive.

Conventional application programs may also implement automatic maintenance and support techniques, that may include rebooting, updating, and/or restarting. These automatic techniques, however, do not provide solutions to specific detected errors but instead provide less precise techniques for correcting the errors, thus risking the integrity of the operations performed by the application programs.

In view of the foregoing, it is desirable to provide systems and methods for reducing the need for manual intervention while providing maintenance and support mechanisms for application programs. It is also desirable to provide systems and methods that offer reliable solutions to specific errors detected during operation of application programs. For example, there is a need for improved systems and methods that provide automated software error correction techniques.

SUMMARY

Consistent with embodiments of the present inventions, systems, methods and computer readable media are disclosed for correcting software errors detected during operation of an application program.

Embodiments and implementations consistent with the invention provide methods and systems for correcting a software error. These methods and systems include receiving an indication that a software error was detected during operation of the application program, generating an error message based on the software error, the error message including an error signature, comparing the error signature with information stored in a patch library database to identify a corresponding correction patch, and correcting, when the corresponding correction patch is identified, the software error by applying the corresponding correction patch.

In another embodiment consistent with the present invention, there is provided an apparatus for correcting software errors of an application program. The apparatus includes a memory device including the application program, a data processor, executing the application program and causing the apparatus to receive an indication that a software error was detected during operation of the application program and generate an error message based on the software error, the error message including an error signature. The apparatus also includes a comparator to compare the error signature with information stored in a patch library database to identify a corresponding correction patch, wherein the apparatus corrects the software error by applying the corresponding correction patch, when the corresponding correction patch is identified.

In another embodiment consistent with the present invention, there is provided a computer-readable storage medium comprising instructions, which when executed on a processor, cause the processor to perform a method of correcting software errors of an application. The method including receiving an indication that a software error was detected during operation of the application program, generating an error message based on the software error, the error message including an error signature, comparing the error signature with information stored in a patch library database to identify a corresponding correction patch, and correcting, when the corresponding correction patch is identified, the software error by applying the corresponding correction patch.

In another embodiment consistent with the present invention, there is provided an apparatus for correcting software errors of an application program. The apparatus including means for receiving an indication that a software error was detected during operation of the application program, means for generating an error message based on the software error, the error message including an error signature, means for comparing the error signature with information stored in a patch library database to identify a corresponding correction patch, and means for correcting, when the corresponding correction patch is identified, the software error by applying the corresponding correction patch.

In another embodiment consistent with the present invention, there is provided an apparatus for correcting software errors of an application program implemented by using Advanced Business Application Programming (ABAP). The apparatus including a memory device including the ABAP application program, a data processor, executing the ABAP application program and causing the apparatus to receive an indication that a software error was detected during operation of the ABAP application program, and generate an ABAP error message based on the software error by using the data processor to implement a database interface, the ABAP error message including an ABAP error signature. The apparatus further includes a comparator to compare the ABAP error signature with information stored in an ABAP patch library database to identify a corresponding correction patch, wherein the apparatus corrects the software error by applying the corresponding correction patch, when the corresponding correction patch is identified.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various exemplary embodiments and aspects of the present invention. In the drawings.

DETAILED DESCRIPTION

Figure 1A:
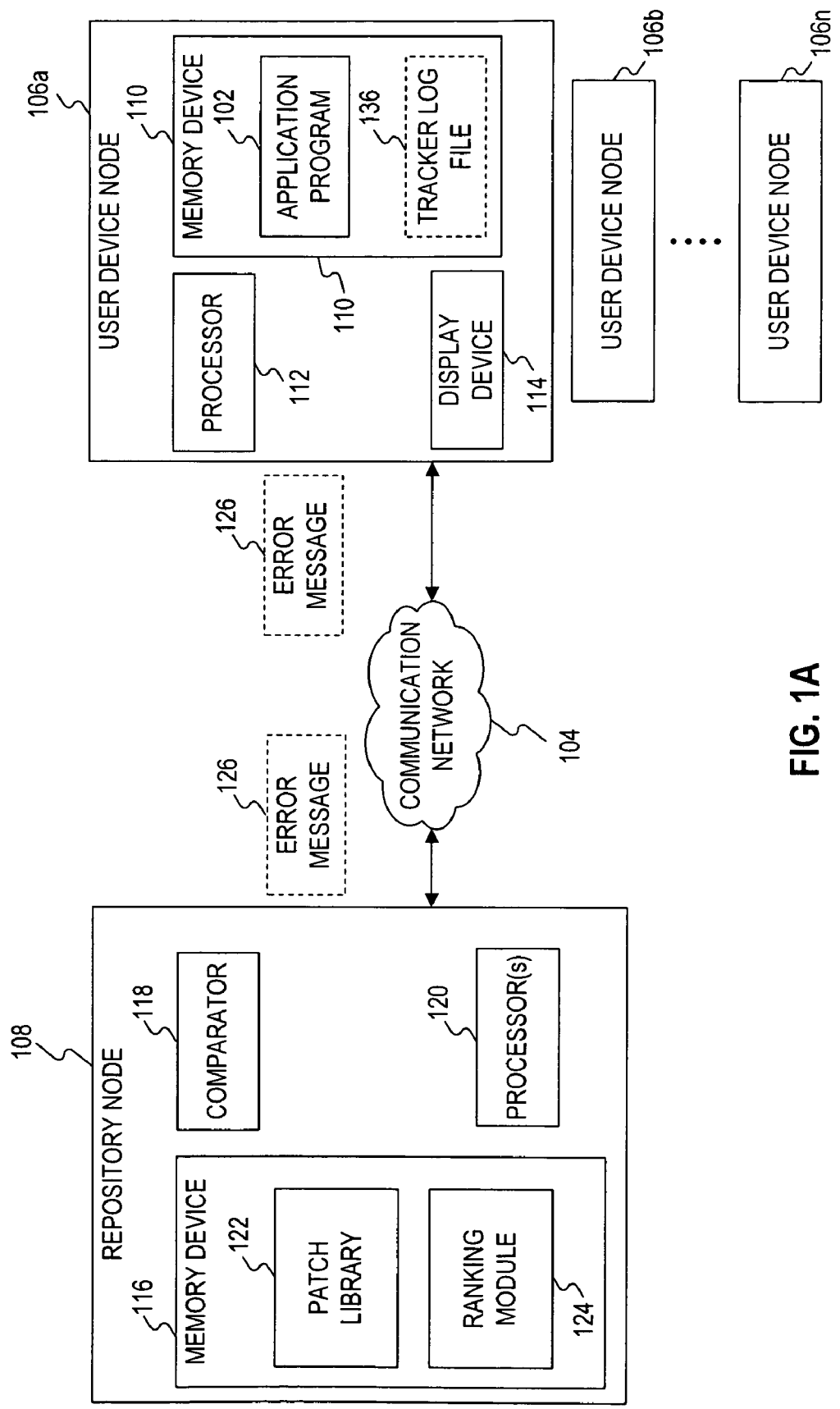
FIG. 1A illustrates an exemplary system for automated correction of a software error, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to automating the process of correcting software errors detected during operation of an application program. Exemplary application programs that may be used in systems consistent with the invention may include application programs that are based on standards developed by SAP AG, such as Advanced Business Application Programming (ABAP). Systems consistent with the invention may also be used with additional standards based on, for example, the Java 2 Enterprise Edition™ ("J2EE") standard and/or the Microsoft NET standard.

For example, as shown in FIG. 1A, an exemplary system 100 may include an application program 102 that may be based on the ABAP standard developed by SAP. System 100 facilitates automated correction of any software errors that may occur during the course of operations of an organization that runs application program 102. Specifically, the components of system 100 may be adapted to detect a software error during the course of operation of application program 102 and generate and/or provide a patch to correct the error without requiring any manual intervention by a user of application program 102.

As shown in FIG. 1A, system 100 may include a communication network 104 that facilitates communication between a plurality of nodes, such as user device 106a-n and repository 108. Communication network 104 may include one or more network types, such as a wide-area network (WAN), a local-area network (LAN), or the Internet. Communication network 104 may operate by wireline and/or wireless techniques and may use transmission control protocol/internet protocol ("TCP/IP") or any other appropriate protocol to facilitate communication between nodes 106a-n and 108 of system 100. Network connections between the nodes of system 100 may be established via Ethernet, telephone line, cellular channels, or other transmission media.

Each node of system 100 comprises of a combination of one or more application programs and one or more hardware components. For example, application programs may include software modules, sequences of instructions, routines, data structures, display interfaces, and other types of structures that may execute operations of the present invention. Further, hardware components may include a combination of central processing units (CPUs), buses, memory devices, storage units, data processors, input devices, output devices, network interface devices and other types of components known to those skilled in the art.

Consistent with an embodiment of the present invention, nodes 106a-n and 108 of system 100 may be respectively implemented by using user devices 106a-n and a repository 108. User device 106a may be any appropriate device for processing sending, receiving, or presenting data. For example, user device 106a may include a personal computer, workstation, mainframe computer, notebook, global positioning device, and/or a handheld device such as a cellular phone or a personal digital assistant.

As illustrated in FIG. 1A, user device 106a may include a memory device 110, a processor 112, and a display device 114. Memory device 110 may be used to store instructions, such as application program 102, which may be executed by processor 112 to cause user device 106a to implement a plurality of operations. Display device 114 may be implemented by using a graphical user interface (GUI) to allow a user of user device 106a to interface with at least a portion of system 100. User device 106a may also include additional components such as input and output devices (not shown). User devices 106b-n may also include memory devices, processors, and application programs as described above with respect to user device 106a.

User devices 106a-n may communicate with repository 108 via communication network 104. The communication may include sending data, such as requests to provide patches for software errors detected in application program 102. Repository 108 may include a memory device 116, comparator 118, and one or more processors 120. Memory device 116 may include patch library 122, ranking module 124, and other application programs (not shown). Patch library 122, ranking module 124, and application programs may be executed using processor(s) 120 and repository 106 may use comparator 118 to search the patch library for a correction patch corresponding to an error message 126 received from user device 106a. Comparator 118 may compare the information included in error message 126 with information stored in the patch library 122 to search for a correction patch specific to the error described in the error message. In the event that comparator 118 may return multiple correction patches, ranking module 124 may be executed on processor 120 to rank the returned patches based on the comparison Although the exemplary embodiment of system 100 is described as having particular components arranged in a particular manner, one skilled in the art will appreciate that system 100 may include additional or fewer components that may be arranged differently. For example, user devices 106a-n and repository 108 may include additional processors and/or memory devices. System 100 may also be implemented with a plurality of repositories 108 or patch libraries 122 and by implementing ranking module 124 in memory device 110. Memory devices 110 and 116 may include all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, user device 106a may detect a software error during operation of application program 102. For example, when processor 112 executes application program 102, application program 102 may perform a data dump at a certain code line of application program 102. Similarly, a software error may be detected when the code corresponding to application program 102 includes an undefined variable and the execution of the code thus stops. Software errors may also be caused by, for example, division of a variable by zero, use of an incorrect operator, memory access violation, improper resource allocation, buffer overflow, incorrect use of a null pointer, detection of an infinite and/or recursive loop, use of an uninitialized variable, a deadlock, a boundary condition, loss of arithmetic precision, race condition, and/or additional software errors that will become apparent to persons of ordinary skill in the art.

Upon detection of a software error, application program 102 and/or user device 106a may generate an error message 126 (which may be sent to repository 108) based on the type of detected error. Error message 126 may be sent to repository 108 over communication network 104 and may include information describing a type of error.

Figure 1B:
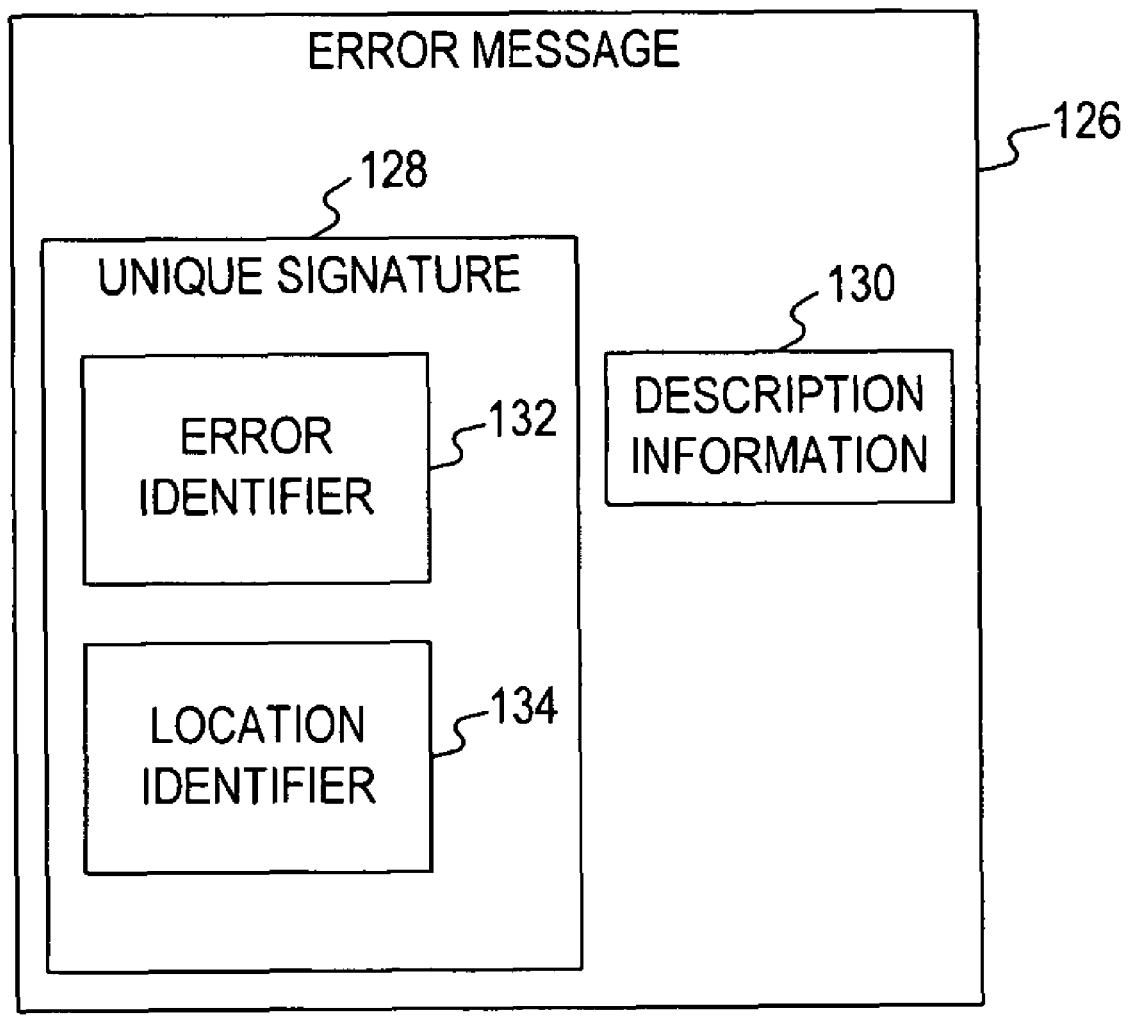
FIG. 1B illustrates a detailed diagram of an exemplary error message, consistent with the present invention.

For example, FIG. 1B illustrates an exemplary embodiment of error message 126 consistent with the present invention. As disclosed in FIG. 1B, error message 126 may include, for example, a unique signature 128 and/or additional description information 130 describing the error. Unique signature 128 may include error identifier 132 that may identify the type of error, and location identifier 134 that may identify a location, in the code of application program 102, where the software error occurred. Error message 126 may be generated by using techniques such as hash algorithms, tags, and other encryption techniques apparent to persons of skill in the art. The hash algorithm may be implemented, for example, to generate unique signature 128 that identifies the type and location of a specific type of error by using a unique string of data. For example, error message 126 may denote the name of application program 102 (ABAP), a line number where the software error occurred (line number "12"), a type of software error (e.g., field symbols not assigned), and/or additional information that may facilitate searching for a correction patch.

Although, error message 126 is illustrated in FIG. 1B to include a plurality of information, it should be understood that error message 126 may include only error identifier 132 identifying the type of error or may only include unique signature 128.

Returning now to FIG. 1A, upon receipt of error message 126, repository 108 may pass the message to processor 120, where error message 126 may be decrypted and information included in the error message may be provided to comparator 118. Comparator 118 and/or processor 120 may access patch library 122 to search for correction patches based on the information retrieved from error message 126. For example, patch library 122 may include predetermined correction patches that may be specific to certain types of software errors.

Correction patches may include or may be stored with information that links the correction patches to the specific types of software errors. For example, a correction patch that may be used to correct the error identified in error message 126 may include unique signature 128 or some other form of identifier. Additional, information linked to or included in correction patches may also include key words that may be used by comparator 118 and/or processor 120 to search and compare information retrieved from error messages to information stored in patch library 122. For example, a correction patch may be stored in patch library 122 with key words "unassigned field" to facilitate the search and comparison performed in repository 108 to locate a correction patch to be used to correct a software error caused by unassigned field symbols.

Additionally, patch library 122 may include instructions which may be used by repository 108 to generate a new correction patch based on a specific type of error identified in error message 126. For example, instead of storing predetermined and assembled correction patches for each type of error in patch library 122, patch library 122 may include one or more instructions which may be used in different combination to generate different correction patches for different types of software errors.

Upon searching of patch library 122 based on the information included in error message 126, comparator 118 and/or processor 120 may identify a plurality of patches that may be used to correct the software error identified by unique signature 128. For example, a first correction patch may include instructions to restart user device 106a after assigning a field symbol in the code corresponding to application program 102 and a second patch may include instructions to recompile the code corresponding to application program 102 after assigning a field symbol in the code. Alternatively, no correction patch may be linked to or stored with information describing an "unassigned field error." Instead, a correction patch may be stored, in patch library 122, with information describing an "unassigned error."

When multiple patches may be determined to be relevant for the software error, ranking module 124 may be executed on processor 120 to rank a plurality of corresponding correction patches or to provide a most relevant correction patch. Ranking module 124 may use search and retrieval techniques known to those skilled in the art, such as the NetWeaver Text Retrieval and Extraction (TREX) search engine offered by SAP AG, and comparison results provided by comparator 118 to rank the corresponding correction patches. The ranking may be based on the comparison of information in error message 126 and information stored in patch library 122, and/or the previous use of particular patches for a particular software error. For example, when a correction patch includes or is linked to information similar to error identifier 132, location identifier 134 and description information 130, then comparator 118 may indicate to ranking module 124 that the degree of match between a specific correction patch and information in error message 126 is high. Similarly, comparator 118 may indicate to ranking module 124 that based on information included in error message 126, a correction patch, with a low degree of match, was retrieved.

Once ranking module 124 ranks the correction patches, repository 108 may send the highest-ranked correction patch to user device 106a. The correction patch may be used to correct the software error in application program 102 and user device 106a may resume normal operation. Alternatively, repository 108 may send a notification, with a plurality of correction patches, to user device 106a. The notification may be displayed on display device 114 and may display information describing that a plurality of correction patches were found. When correction patches are found the notification may also include ranks of correction patches that may be available. User device 106a may also allow a user to select a correction patch, and may correct the software error detected in application program 102.

It should be understood that the use of ranking module 124 is only exemplary and system 100 may be implemented without ranking module 124 and/or any additional components that may not be required to implement the error correction techniques disclosed herein. Moreover, a tracker log file 136 may be optionally implemented in user device 106a to store a record of the types of correction patches applied for specific types of software errors. Tracker log file 136 may facilitate quicker retrieval of a specific correction patch from repository 108 when a correction patch may be required to correct a software error that may have been encountered earlier. For example, user device 106a may search through the records in tracker log file 136 to generate an error message 126 that specifically requests a previously used correction patch. Further, a record of a selection of a specific correction patch may be made in tracker log file 136 and may be communicated to ranking module 124. This selection information may subsequently be used to rank particular correction patches higher. Feedback from users of user devices 106a-n may also be provided to ranking module 124 for subsequent ranking. The feedback may incorporate the performance of corrections patches during correction of software errors.

Alternatively, repository 108 may identify no correction patch that exactly matches the information included in error message 126 and repository 108 may send a notification that no correction patches were found. Tracker log file 136 may then be used to store a record of any encountered software errors for which no correction patches were available in repository 108. The unavailability of a correction patch may cause user device 106a to report the software error to a vendor of application program 102, so that a new correction patch may be generated. The vendor or user of user device 106a may generate a new correction patch based on the error and may store the new correction patch with corresponding information in patch library 122. Alternatively, user device 106a and/or repository 108 may send queries over communication network to additional repositories (not shown) to search for correction patches not included in patch library 122. Patch library 122, may subsequently be updated if a new correction patch is found.

Figure 2:
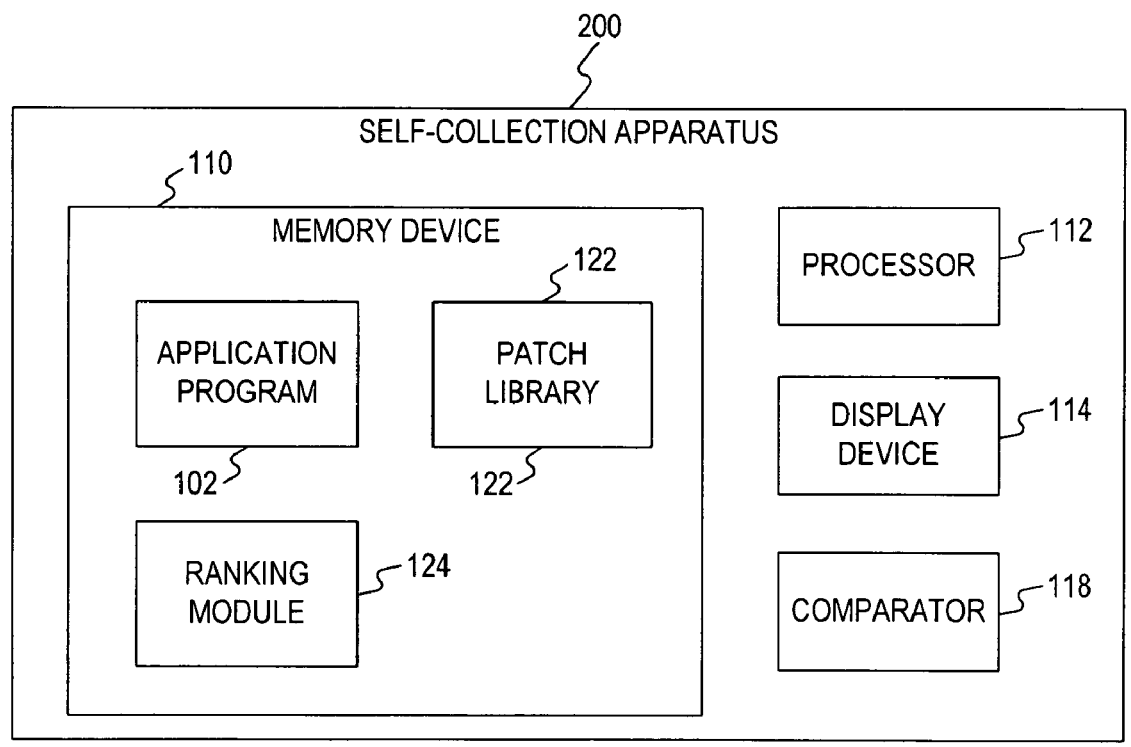
FIG. 2 illustrates an exemplary self-correction apparatus for automated correction of a software error, consistent with the present invention.

FIG. 2 illustrates an exemplary embodiment of a self-correction apparatus 200, which may be used in an additional implementation of the present invention. Self-correction apparatus 200 may be implemented by user device 106a and may include components similar to those described above as part of system 100. For example, apparatus 200 may include memory device 110, processor 112, display device 114, and comparator 118. Memory device 110 may include application program 102, patch library 122, and ranking module 124, which may be executed by processor 112 to cause apparatus 200 to implement a plurality of operations.

Apparatus 200 may correct software errors in application program 102 by accessing patch library 122 stored in memory device 110. The remaining operations of apparatus 200 may be similar to the operations of user device 106a and repository 108. However, in the implementation of FIG. 2, the software errors may be detected by apparatus 200 without the need to communicate with repository 108 over communication network 104. Thus, apparatus 200 detect and also self-correct any software errors detected during running of application program 102. One of skill in the art would appreciate that application program 102 and patch library 122 may be stored in any computer-readable storage medium, such as magneto-optical disks and/or CD-ROM disks, to provide a user of application program 102 access to patch library 122 within the same disk.

Figure 3:
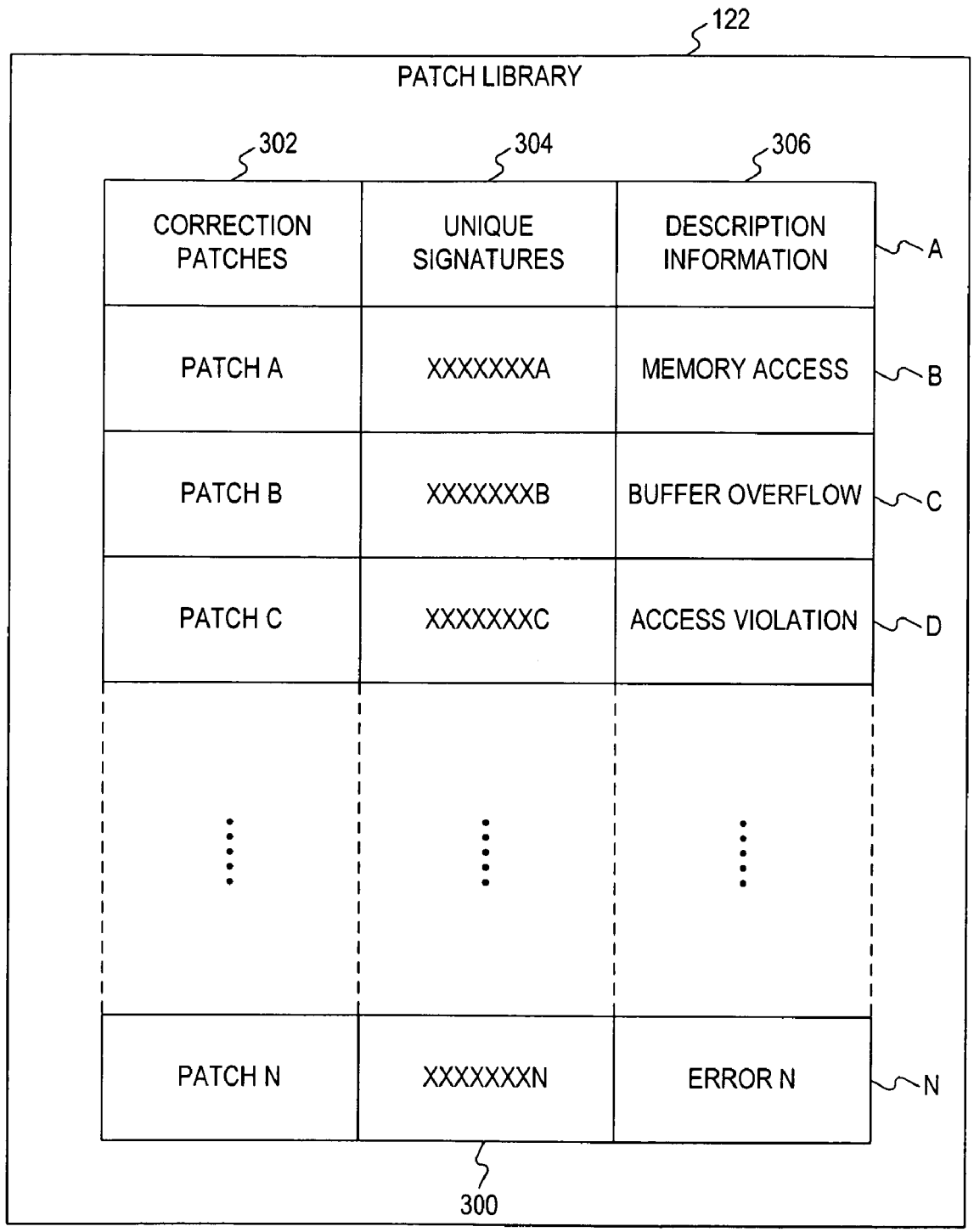
FIG. 3 illustrates a detailed diagram of an exemplary patch library, consistent with the present invention.

FIG. 3 illustrates an exemplary embodiment of patch library 122 consistent with the present invention. Patch library 122 may include a database table 300 with columns 302, 304, and 306 and rows 1-N. Column 302 may include correction patches A-N and/or may include instructions used to generate patches A-N. Column 304 may include unique signatures corresponding to the correction patches stored in column 302. Column 306 may include description information describing a type of software error that may be corrected by using a corresponding patch. For example, patch A may have a unique signature XXXXXXXA and the description information of patch A may include keywords "MEMORY ACCESS" to reflect the type of error that patch A may correct.

Patch library 122 may be searched for correction patches based on an error message received from an apparatus or device operating an application program that has a software error. To facilitate retrieval of correction patches for specific software errors, the apparatus and/or application program may be configured to generate an error message with the same or similar unique signatures and/or description information as may be stored in patch library 122. For example, if an application program 102 encounters an error due to a buffer overflow then the application program or the apparatus running the application program may generate an error message that includes unique signature XXXXXXXB and/or description information "BUFFER OVERFLOW."

As will be apparent to those of skill in the art, the error messages may not include the exact same unique signatures and/or description information, and patch library 122 may be configured to be searchable based on a similar unique signature or limited description information, such as a keyword "BUFFER" or "OVERFLOW." However, the greater the degree of match between information included in the error message and information stored in patch library 122, the more corresponding a particular correction patch may be considered.

As is illustrated in patch library 122, some correction patches may include or may be linked to description information similar to other correction patches. For example, Patch A may be associated with key words "MEMORY ACCESS" while Patch C may be associated with key words "ACCESS VIOLATION." The similarity in description information of patches may cause patch library 122 to provide the option of applying one of the correction patches, both of the correction patches, and/or apply the best correction patch based on the relevance of Patch A and Patch C to the particular software error. As described above, this relevance may be calculated by using known search engine techniques to determine the most corresponding match.

One of skill in the art would appreciate that the depiction of database table 300 in patch library 122 is for purposes of exemplary description and not limitation. Database table 300 may include a higher or lower number of columns and/or rows and/or data. Further, unique signatures may be arranged in patch library 122 without the use of database table 300. Unique signatures and/or description information may also be stored within correction patches. Moreover, additional data, such as keywords, may be stored in patch library 122 that may facilitate the matching of data included in an error message and data included in or linked to correction patches.

Figure 4:
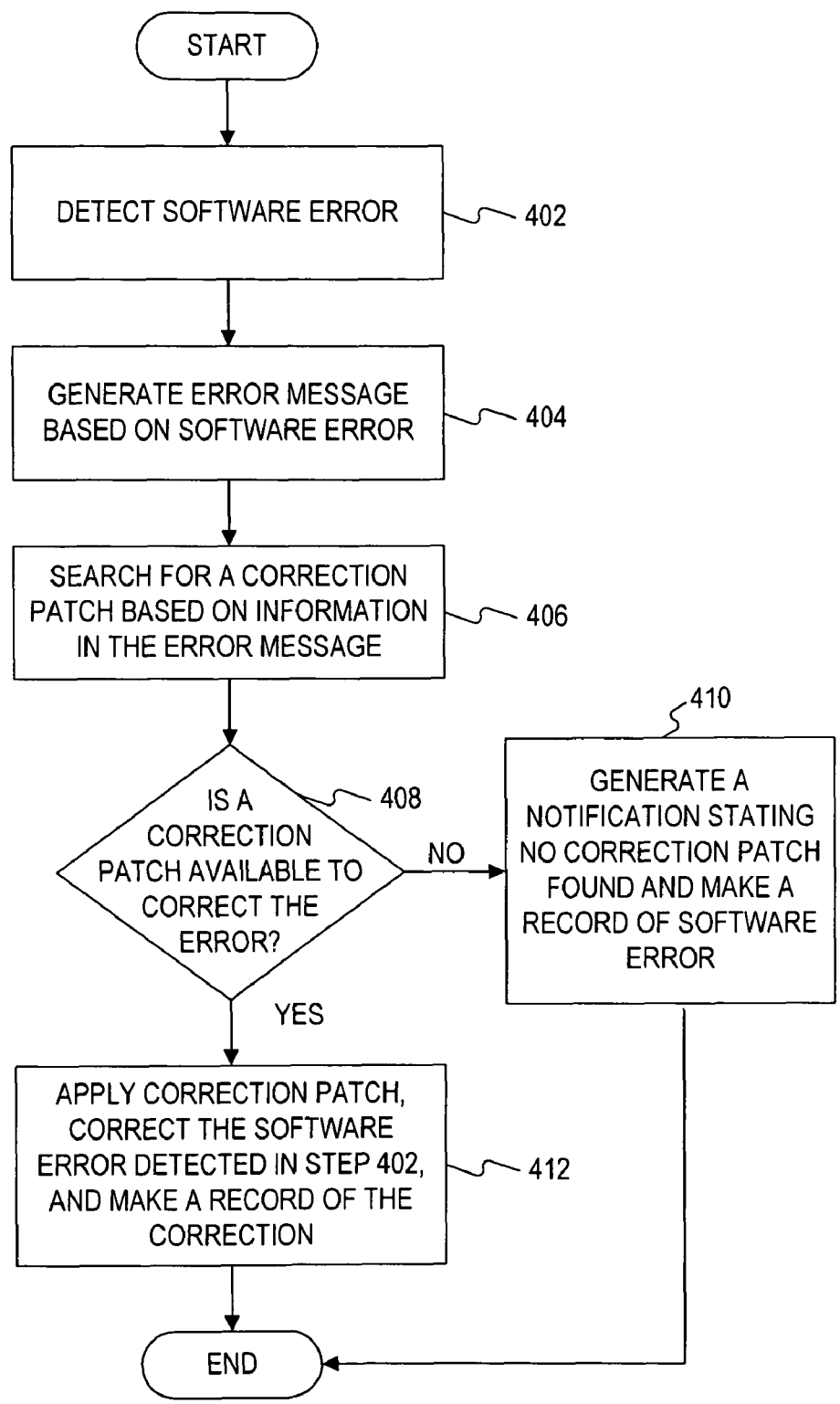
FIG. 4 illustrates a flowchart illustrating an exemplary process 400 for automated correction of a software error, consistent with the present invention.

FIG. 4 illustrates an exemplary flowchart of a process 400 for automated correction of a software error. Process 400 may, for example, be implemented by using system 100 or apparatus 200. The process may begin in step 402 where a software error may be detected. Next, in step 404, an error message may be generated based on the software error detected in step 402. The error message may include a unique signature identifying the type of error, the location of the error in a line of code of application program 102, and additional information describing the error.

The process may then proceed to step 406, where a correction patch may be searched for based on the information in the error message generated in step 404. For example, a patch library 122 may be searched for a corresponding correction patch that includes a unique signature and/or description information similar to the information included in the error message. Next, it is determined in step 408 if a correction patch is available to correct the error. The method may proceed to step 410, when a correction patch may not be available to correct the error. In step 410, a notification may be generated stating that no correction patch may be found and a record may be made of the software error and that no correction patch was found for the software error. For example, a record may be created in tracker log file 136 of system 100 and a message may be sent to a vendor or a user that a new correction patch may be needed to correct the error and a new correction patch may be added into patch library 122

Figure 5:
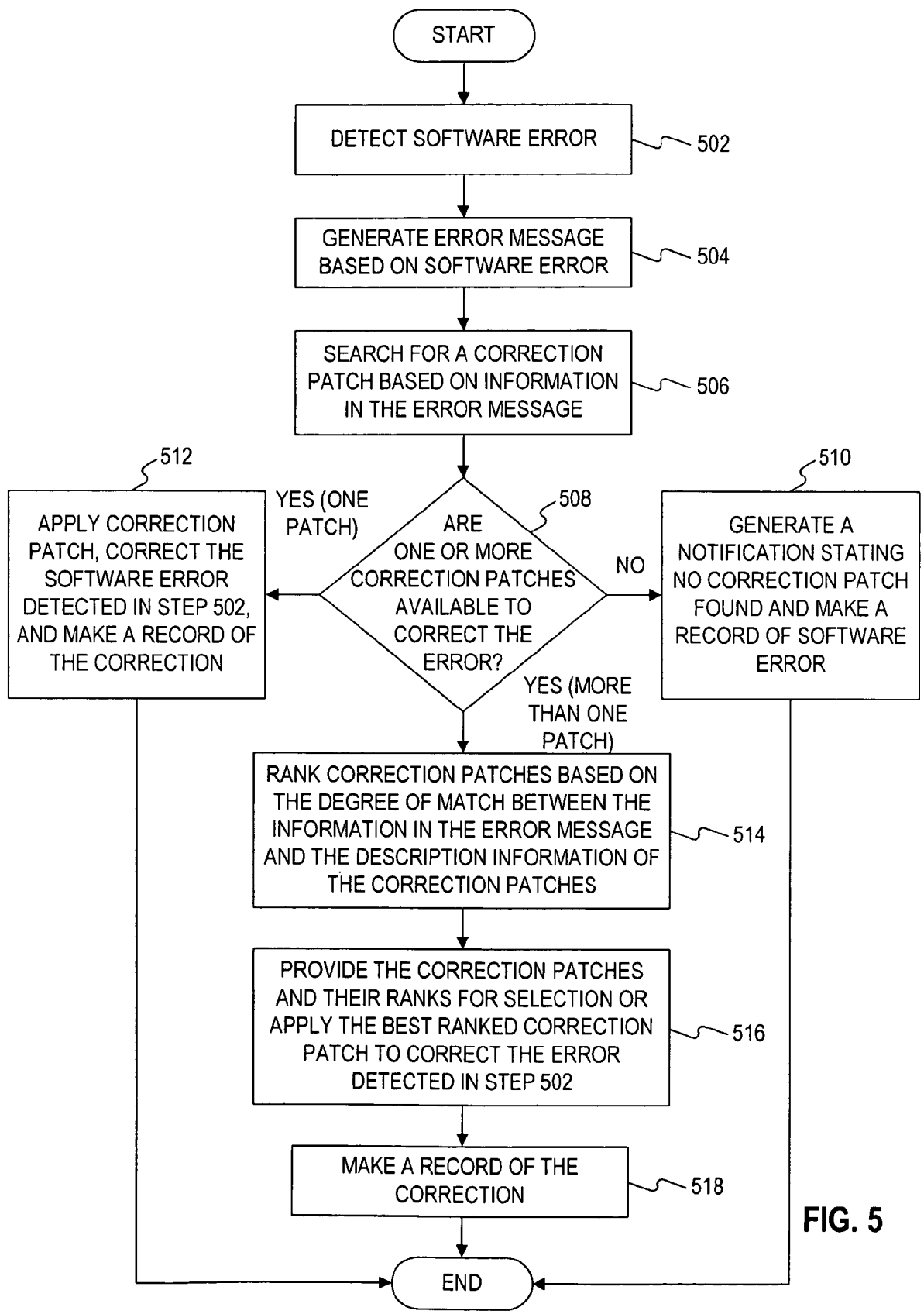
FIG. 5 illustrates a flowchart illustrating an exemplary process 500 for automated correction of a software error by using a best ranked correction patch, consistent with the present invention.

FIG. 5 illustrates an exemplary flowchart of a process 500 for automated correction of a software error by using a best ranked correction patch. Process 500 may be implemented, for example, by using system 100 or apparatus 200. The process may begin in step 502 where a software error may be detected. Next, in step 504, an error message may be generated based on the software error detected in step 502. The error message may include a unique signature identifying the type of error, the location of the error in a line of code of application program 102, and any additional information describing the error.

The process may then proceed to step 506, where a correction patch may be searched for based on the information in the error message generated in step 504. For example, a patch library 122 may be searched for a corresponding correction patch that includes a unique signature and/or description information similar to the information included in the error message. Next, it may be determined in step 508 if one or more correction patches may be available to correct the error. The method may proceed to step 510 when a correction patch may not be available to correct the error. In step 510, a notification may be generated stating that no correction patch may be found and a record may be made of the software error and that no correction patch was found for the software error. For example, a record may be created in tracker log file 136 of system 100 and/or additional attempts may be made to search for a correction patch from additional repositories, and the process may end.

Returning now to step 508, the method may proceed to step 512 when a single correction patch may be available to correct the software error detected in step 502. In step 512, the correction patch may be applied to correct the error and a record may be made indicating the type of software error and the correction patch that may have been applied to correct the software error, and the process may end. Alternatively, when it is determined at step 508 that more than one correction patch may be available to correct the software error the method may proceed to step 514.

In step 514, the correction patches retrieved in step 508 may be ranked based on the degree of match between the information in the error message and the description information of the correction patches. Step 514 may be performed by, for example, ranking module 124 which may implement known search engine techniques. Next, in step 516, the ranks and correction patches may be provided for selection by a user or the best ranked correction patch may be applied to correct the error. The method may proceed to step 518, where a record is made, for subsequent ranking, of the type of software error and the correction patch that may have been applied to correct the software error. For example, the record may be used to rank previously used correction patches higher when similar software errors may be detected.

For example, as shown in FIG. 1A, an exemplary system 100 may include an application program 102 that may be based on the ABAP standard developed by SAP. System 100 facilitates automated correction of any software errors that may occur during the course of operations of an organization that runs application program 102. Specifically, the components of system 100 may be adapted to detect a software error during the course of operation of application program 102 and generate and/or provide a patch to correct the error without requiring any manual intervention by a user of application program 102.

Figure 6A:
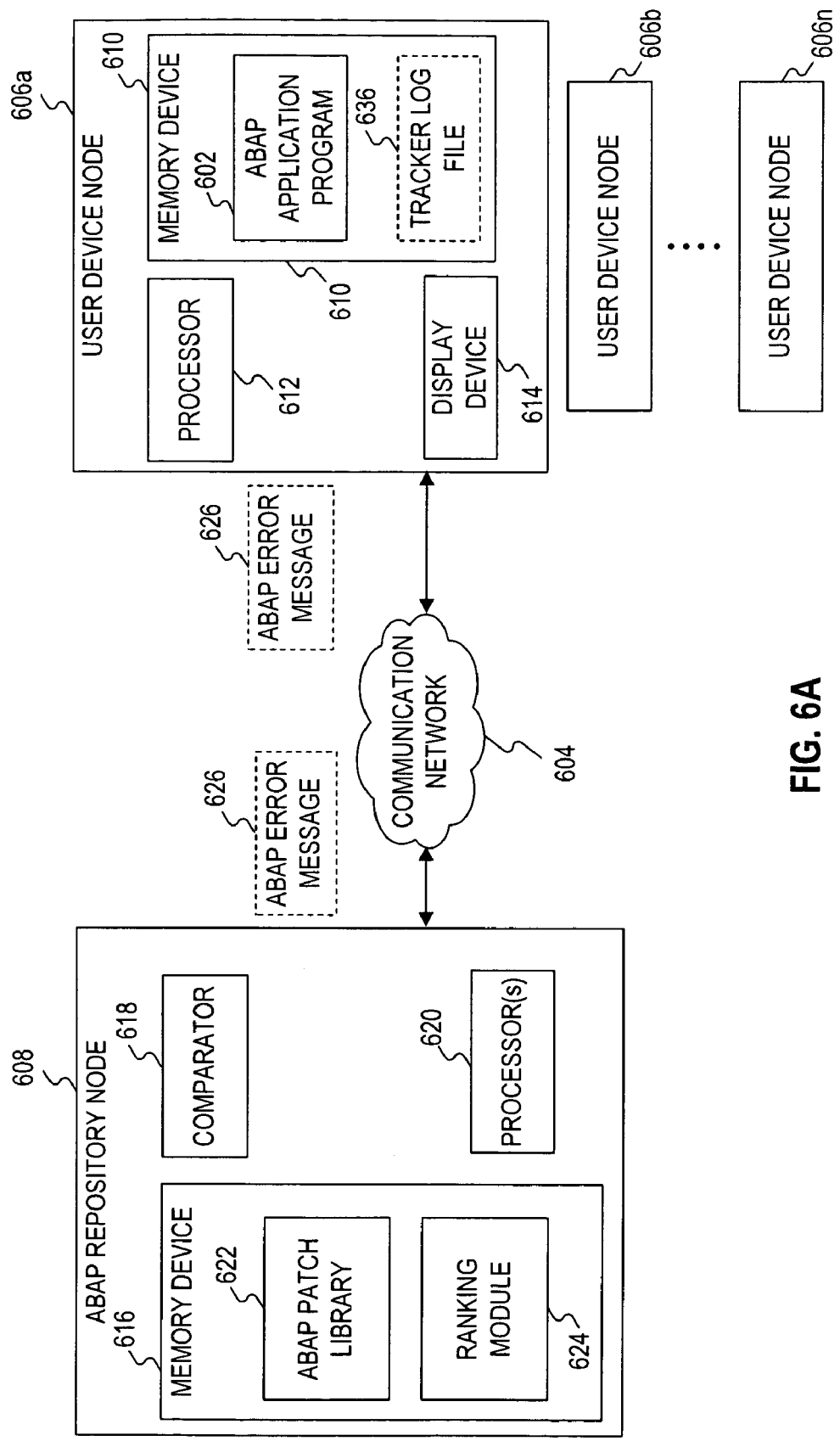
FIG. 6A illustrates an exemplary system for automated correction of a software error detected during operation of a software based on Advanced Business Application Programming (ABAP) language, consistent with the present invention.

FIG. 6A illustrates an exemplary system for automated correction of a software error detected during application of an ABAP application program. System 600 may include components similar to the ones disclosed in FIG. 1A. For example, system 600 may include a communication network 604 that facilitates communication between user device 606a-n and ABAP repository 608. User device 606a may include a memory device 610, a processor 612, and a display device 614.

Memory device 610 may be used to store instructions, such as ABAP application program 602, which may be executed by processor 612 to cause user device 606a to implement a plurality of operations. ABAP application program 602 may be based on a concept of Logical Databases (LDBs), which facilitate in extraction of data from specific data bases. For example, ABAP application program 602 may be customized for specific end-users and may be used to interface with data bases specific to a particular organization and/or an end user and processor 612 may be configured to operate as database interface during operation of ABAP application program 602. System 600 may also include an ABAP repository node 608, which may include a memory device 616, a comparator 618, and a processor 620, where memory device 616 may include an ABAP patch library 622 and a ranking module 624.

Consistent with an embodiment of the invention, user device 606a may detect a software error during operation of ABAP application program 602. Upon detection of a software error, ABAP application program 602 and/or user device 606a may generate an error message 626 (which may be sent to repository ABAP repository 608) based on the type of detected error. Processor 612 may be used to function as a database interface during transmission of error message 626. For example, processor 612 may convert database-independent ABAP error messages 626, generated by user device 606a into statements understood by the ABAP repository node 608. Processor 612 may handle communication with the relational database (not shown) that may be required to run ABAP application program 602. Once converted error message 626 may include information describing a type of error.

Figure 6B:
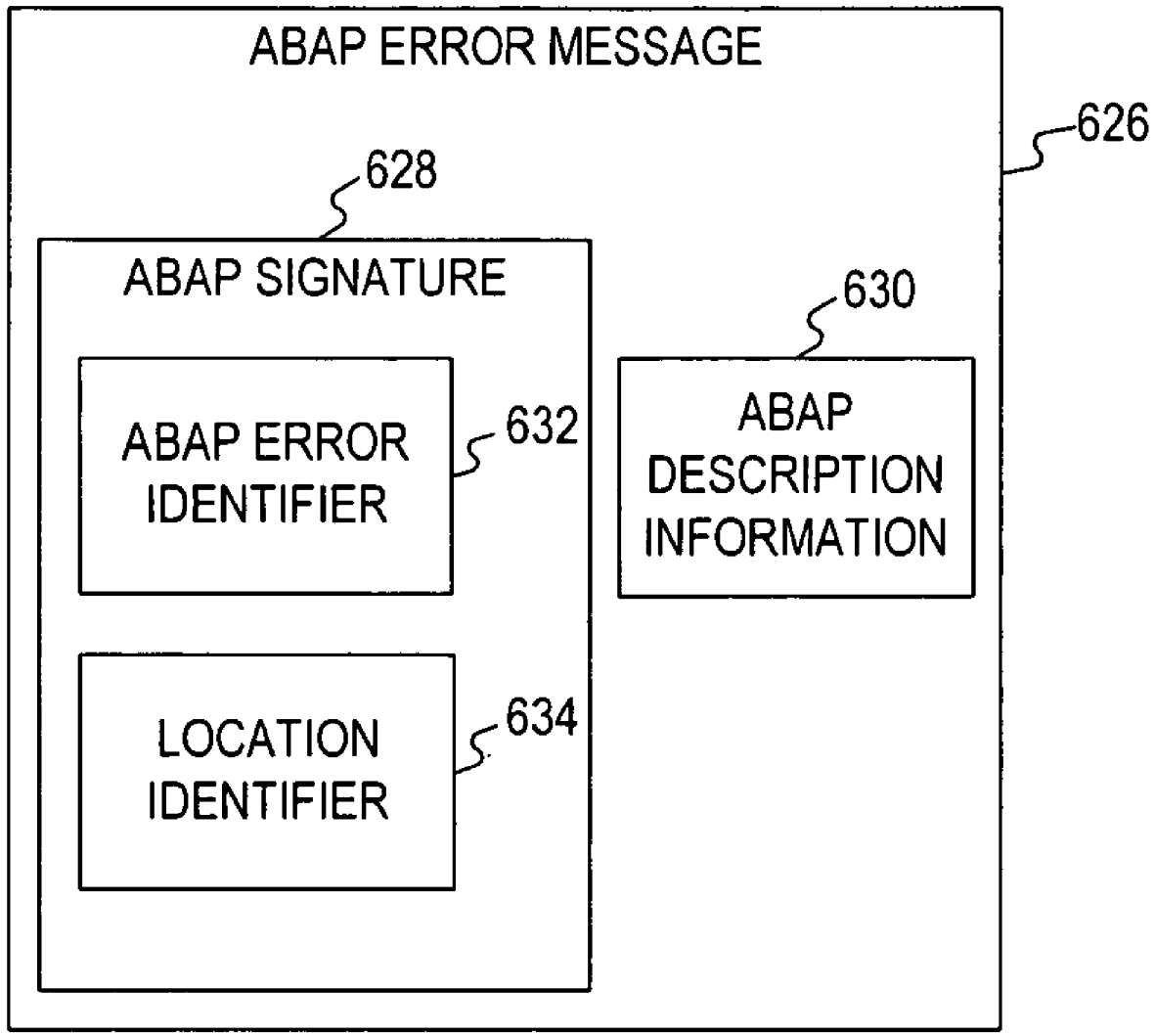
FIG. 6B illustrates a detailed diagram of an exemplary ABAP error message, consistent with the present invention.

For example, FIG. 6B illustrates an exemplary embodiment of an ABAP error message 626 consistent with the present invention. As disclosed in FIG. 6B, ABAP error message 626 may include, for example, an ABAP unique signature 628 and/or additional ABAP description information 630 describing the error. ABAP unique signature 628 may include ABAP error identifier 632 that may identify the type of error, and location identifier 634 that may identify a location, in the code of ABAP application program 602, where the software error occurred. ABAP signature may be defined by using ABAP syntax. Further, ABAP error message 626 may be generated as a data object.

Returning now to FIG. 6A, upon receipt of ABAP error message 626, ABAP repository 608 may pass the message to processor 620, where error message 626 may be decrypted and information included in the error message may be provided to comparator 618. Comparator 618 and/or processor 620 may access ABAP patch library 622 to search for correction patches specific to ABAP application program 602.

Upon searching of ABAP patch library 622 based on the information included in ABAP error message 626, comparator 618, processor 620, and/or ranking module 624 may identify and/or rank a plurality of patches or may identify no corresponding correction patches. Once a corresponding correction patch may be identified, ABAP repository node 608 may send the correction patch to user device 606a for correction of ABAP application program 602. A record of the correction patch used to correct a particular error may be stored in tracker log file 636 for subsequent ranking operations as discussed above in reference to system 100.

Alternatively, ABAP repository 608 may send a notification to user device 606 a that no correction patches were found. Tracker log file 636 may then be used to store a record of any encountered software errors for which no correction patches were available in repository ABAP 608. The unavailability of a correction patch may cause user device 606a to report the software error to a vendor of ABAP application program 602, so that a new correction patch may be generated. The vendor or user of user device 606a may generate a new correction patch based on the error and may store the new correction patch with corresponding information in ABAP patch library 622. Alternatively, user device 606a and/or ABAP repository 608 may send queries over communication network to additional repositories (not shown) to search for correction patches not included in ABAP patch library 622 and ABAP patch library 622 may subsequently be updated if a new correction patch is found.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a corresponding combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of correcting software errors of an application program, comprising:
  receiving an indication that a software error was detected during operation of the application program;
  generating an error message based on the software error, the error message including an error signature having a unique string of data including an error identifier and a location identifier, wherein the error message is generated by encrypting information associated with the software error and the application program, and further wherein the error identifier identifies a type of the software error and the location identifier identifies a location of the software error in code of the application program;
  comparing the error signature with information stored in a patch library database to identify a corresponding correction patch, the information stored in the patch library including a correction signature having a unique string of data associated with the corresponding correction patch, wherein comparing the error signature with the information includes comparing the unique string of data included in the error signature with the unique string of data included in the correction signature;
  correcting, when the corresponding correction patch is identified, the software error by applying the corresponding correction patch;
  generating, when the corresponding correction patch is not identified, a response message indicating that the corresponding correction patch was not identified; and
  transmitting the response message to a vendor of the application program to request generation of a new correction patch.

2. The method of claim 1, wherein correcting the software error further comprises:
  ranking, prior to the applying, the corresponding correction patch when the comparison provides a plurality of potential correction patches to correct the software error, wherein the corresponding correction patch is ranked highest;
  displaying a list of the plurality of potential correction patches including the corresponding correction patch, wherein the list includes ranks corresponding to the potential correction patches;
  applying the corresponding correction patch when a user of the application program selects the corresponding correction patch for correction of the software error; and
  storing, in a tracker log file, a type of the software error and the corresponding correction patch applied to correct the software error.

3. The method of claim 1, further comprising:
   displaying a notification when the corresponding correction patch is not identified in the patch library database; and
   storing, in a tracker log file, a type of the software error and the notification indicating that the software error was not corrected.

4. The method of claim 1, wherein the patch library database includes:
   a plurality of correction patches corresponding to specific types of software errors; and
   error signatures corresponding to the plurality of correction patches, the error signatures being compared with the error signature included in the error message.

5. An apparatus for correcting software errors of an application program, comprising:
   a memory device including the application program;
   a data processor, executing the application program and causing the apparatus to:
      receive an indication that a software error was detected during operation of the application program; and
      generate an error message based on the software error, the error message including an error signature having a unique string of data including an error identifier and a location identifier, wherein the error message is generated by encrypting information associated with the software error and the application program, and further wherein the error identifier identifies a type of the software error and the location identifier identifies a location of the software error in code of the application program; and
   a comparator to compare the error signature with information stored in a patch library database to identify a corresponding correction patch, the information stored in the patch library including a correction signature having a unique string of data associated with the corresponding correction patch, wherein comparing the error signature with the information includes comparing the unique string of data included in the error signature with the unique string of data included in the correction signature,
   wherein the apparatus corrects the software error by applying the corresponding correction patch, when the corresponding correction patch is identified, and
   wherein the data processor generates, when the corresponding correction patch is not identified, a response message indicating that the corresponding correction patch was not identified, and transmits the response message to a vendor of the application program to request generation of a new correction patch.

6. The apparatus of claim 5, wherein the error message includes description information describing the software error by providing key words relating to the software error.

7. The apparatus of claim 5, further comprising:
   a ranking module to rank, prior to the applying, the corresponding correction patch when the comparison provides a plurality of potential correction patches to correct the software error, the corresponding correction patch being ranked the highest; and
   a display device to display a list of the plurality of potential correction patches including the corresponding correction patch, the list including ranks corresponding to the potential correction patches;
   wherein the apparatus applies the corresponding correction patch when a user of the application program selects the corresponding correction to correct the software error.

8. The apparatus of claim 7, wherein the ranking is performed based on a degree of match between the error signature and the information stored in the patch library database.

9. The apparatus of claim 5, further comprising a tracker log file to store a type of the software error and the corresponding correction patch applied to correct the software error.

10. The apparatus of claim 5, further comprising:
    a display device to display a notification when the corresponding correction patch is not identified in the patch library database; and
    a tracker log file to store a type of the software error and the notification indicating that the software error was not corrected.

11. The apparatus of claim 5, wherein the patch library database is stored on the memory device and includes:
    a plurality of correction patches corresponding to specific types of software errors; and
    error signatures corresponding to the plurality of correction patches, the error signatures being compared with the error signature included in the error message.

12. The apparatus of claim 11, wherein:
    the patch library database includes description information corresponding to the plurality of correction patches;
    the error message includes description information corresponding to the software error; and
    the comparator further compares the description information in the error message with description information corresponding to the plurality of correction patches.

13. A non-transitory computer-readable storage medium comprising instructions, which when executed on a processor, cause the processor to perform a method of correcting software errors of an application program, the method comprising: receiving an indication that a software error was detected during operation of the application program; generating an error message based on the software error, the error message including an error signature having a unique string of data including an error identifier and a location identifier, wherein the error message-that is generated by encrypting information associated with the software error and the application program, and further wherein the error identifier identifies a type of the software error and the location identifier identifies a location of the software error in code of the application program; comparing the error signature with information stored in a patch library database to identify a corresponding correction patch, the information stored in the patch library including a correction signature having a unique string of data associated with the corresponding correction patch, wherein comparing the error signature with the information includes comparing the unique string of data included in the error signature with the unique string of data included in the correction signature; correcting, when the corresponding correction patch is identified, the software error by applying the corresponding correction patch; generating, when the corresponding correction patch is not identified, a response message indicating that the corresponding correction patch was not identified; and transmitting the response message to a vendor of the application program to request generation of a new correction patch.

14. The computer-readable storage medium of claim 13, wherein correcting the software error further comprises:
    ranking, prior to the applying, the corresponding correction patch when the comparison provides a plurality of potential correction patches to correct the software error, the corresponding correction patch being ranked the highest;

displaying a list of the plurality of potential correction patches including the corresponding correction patch, the list including ranks corresponding to the potential correction patches;

applying the corresponding correction patch when a user of the application program selects the corresponding correction patch for correction of the software error; and storing, in a tracker log file, a type of the software error and the corresponding correction patch applied to correct the software error.

15. The computer-readable storage medium of claim 13, further comprising:

displaying a notification when the corresponding correction patch is not identified in the patch library database; and storing, in a tracker log file, a type of the software error and the notification indicating that the software error was not corrected.

16. The computer-readable storage medium of claim 13, wherein the patch library database includes:

a plurality of correction patches corresponding to specific types of software errors; and error signatures corresponding to the plurality of correction patches, the error signatures being compared with the error signature included in the error message.

17. A computer-implemented method of correcting software errors of an application program, comprising:

receiving an error message indicating that a software error was detected during operation of the application program, the error message including an error signature having a unique string of data including an error identifier and a location identifier, wherein the error message is generated by encrypting information associated with the software error and the application program, and further wherein the error identifier identifies a type of the software error and the location identifier identifies a location of the software error in code of the application program;

comparing the error signature with information stored in a patch library database to identify a corresponding correction patch, the information stored in the patch library including a correction signature having a unique string of data associated with the corresponding correction patch, wherein comparing the error signature with the information includes comparing the unique string of data included in the error signature with the unique string of data included in the correction signature;

generating a correction message including the corresponding correction patch or instructions to generate the corresponding correction patch when the corresponding correction patch is identified;

generating, when the corresponding correction patch is not identified, a response message indicating that the corresponding correction patch was not identified; and transmitting the response message to a vendor of the application program to request generation of a new correction patch.

18. A non-transitory computer-readable storage medium comprising instructions, which when executed on a processor, cause the processor to perform a method of correcting software errors of an application program, the method comprising: receiving an error message indicating that a software error was detected during operation of the application program, the error message including an error signature having a unique string of data including an error identifier and a location identifier, wherein the error message that-is generated by encrypting information associated with the software error and the application program, and further wherein the error identifier identifies a type of the software error and the location identifier identifies a location of the software error in code of the application program; comparing the error signature with information stored in a patch library database to identify a corresponding correction patch, the information stored in the patch library including a correction signature having a unique string of data associated with the corresponding correction patch, wherein comparing the error signature with the information includes comparing the unique string of data included in the error signature with the unique string of data included in the correction signature; generating a correction message including the corresponding correction patch or instructions to generate the corresponding correction patch when the corresponding correction patch is identified; generating, when the corresponding correction patch is not identified, a response message indicating that the corresponding correction patch was not identified; and transmitting the response message to a vendor of the application program to request generation of a new correction patch.

* * * * *